United States Patent
Nisper et al.

(10) Patent No.: US 7,359,065 B2
(45) Date of Patent: Apr. 15, 2008

(54) METHOD OF COMBINING HOLOGRAMS

(75) Inventors: Jon Nisper, Grand Rapids, MI (US);
Michael Mater, Chelsea, MI (US);
Alex Klooster, Ann Arbor, MI (US);
Zhenhua Huang, Ann Arbor, MI (US)

(73) Assignee: Coherix, Inc., Ann Arbor, MI (US)

( * ) Notice: Subject to any disclaimer, the term of this patent is extended or adjusted under 35 U.S.C. 154(b) by 72 days.

(21) Appl. No.: 11/181,664

(22) Filed: Jul. 14, 2005

(65) Prior Publication Data

US 2007/0024866 A1    Feb. 1, 2007

(51) Int. Cl.
*G01B 11/02* (2006.01)
(52) U.S. Cl. .................................................... 356/512
(58) Field of Classification Search ................ 356/457, 356/458, 489, 495, 511, 512
See application file for complete search history.

(56) References Cited

U.S. PATENT DOCUMENTS

| | | | | |
|---|---|---|---|---|
| 5,335,062 | A * | 8/1994 | Hofmeister et al. | 356/457 |
| 5,907,404 | A * | 5/1999 | Marron et al. | 356/489 |
| 5,926,277 | A * | 7/1999 | Marron et al. | 365/512 |
| 6,744,517 | B1 * | 6/2004 | Forno et al. | 356/450 |
| 7,061,625 | B1 * | 6/2006 | Hwang et al. | 356/511 |
| 2003/0142317 | A1 * | 7/2003 | Mater | 356/450 |
| 2005/0002041 | A1 * | 1/2005 | Mater | 356/512 |

* cited by examiner

*Primary Examiner*—Michael A. Lyons
(74) *Attorney, Agent, or Firm*—Jeffrey Schox

(57) ABSTRACT

A method of combining holograms or phase images of an object is disclosed, where attributes of the data used to record two phase images of overlapping portions of the surface of an object are compared and used to match pixels of the two recordings. A relative tilt angle and direction correction is added, and a third phase image is generated. Phase images of objects which are too large to be imaged in an interferometric imaging system can thus be produced.

12 Claims, 3 Drawing Sheets

METHOD OF COMBINING HOLOGRAMS

FIELD OF THE INVENTION

The field of the invention is the field of interferometric measurement of the surface topography of objects.

BACKGROUND

FIG. 1 shows a sketch of a prior art interferometer. The particular interferometer shown in FIG. 1 is conventionally called a Michelson interferometer, and has been used since the nineteenth century in optical experiments and measurements. A light source 10 produces light which is collimated by passing through a lens system 11 to produce a parallel beam of light 12 which passes to a beamsplitter 13. The beam of light 12 is partially reflected to a reference mirror 14 and partially transmitted to an object 15. Light reflected from the reference mirror 14 partially passes through the beamsplitter to an image receiver 16. Light reflected from the object is partially reflected from the beamsplitter 15 and is passed to the image receiver 16. The image receiver 16 may be film, or may be an electronic photodetector or CCD or CMOS array.

If both the reference mirror 14 and the object 15 are flat mirrors aligned perpendicular to the incoming light from beam 12, and the light path traversed by the light from the light source to the image receiver is identical, the light from both the reference mirror and the object mirror will be in phase, and the image receiver will show a uniformly bright image. Such devices were the bane of undergraduate optics students before the advent of lasers, since the distances had to be equal to within a small part of the wavelength of light and the mirrors had to be aligned within microradians. Even with the advent of lasers, such devices are subject to vibration, thermal drift of dimensions, shocks, etc.

However, the Michelson interferometer design of FIG. 1 is useful to explain the many different types of interferometers known in the art. In particular, suppose the reference mirror 14 is moved back and forth in the direction of the arrow in FIG. 1. As the reference mirror is moved, the phase of the light beam reflected from the reference mirror and measured at the image receiver 16 will change by 180 degrees with respect to the phase of the light reflected from the object 15 for every displacement of one quarter wavelength. The light from the two beams reflected from the object 15 and the reference mirror 14 will interfere constructively and destructively as the mirror moves through one-quarter wavelength intervals. If the intensity on both the reference and object beam is equal, the intensity at the image receiver will be zero when the mirrors are positioned for maximum destructive interference. Very tiny displacements of one of the mirrors 14 or 15 can thus be measured.

FIG. 2 shows a sketch of an interferometer much like the interferometer of FIG. 1, except that diffusely reflecting objects 25 can be imaged on the image receiver 16 by using an additional lens 20. FIG. 2 shows also the problem solved by the method of the present invention, where the object 25 which is to be measured has a surface which is bigger than the field of view of the imaging optics.

Another inspection technique that is very useful is when the Michelson interferometer of FIG. 1 or FIG. 2 is used to compare the flatness of the surface of object 15 with the flatness of the reference mirror. As noted, if there is a difference in distance between the object mirror and the corresponding part of the reference mirror, the light from the two beams will interfere constructively or destructively and produce a pattern in the image receiver. Such patterns are generally called fringe patterns or interferograms, and can be likened to the lines on a topographic map. Such lines, as on a topographic map, can be interpreted as slopes, hills and depressions; the lines are separated in "height" by a half wavelength of the light from the light source 10.

One problem with the above inspection technique is that there are no numbers telling the difference between a depression and a hill, or in which direction the slope runs. However, if the reference mirror is moved, the lines will move, and, for example, the circles on a hill will shrink and a depression will expand for a particular direction of travel.

Interferometric techniques work very well for optical surface inspection to check whether the surface is flat, or curved to within a certain specification. However, for many surfaces which are rough on the scale of the wavelength of visible light, or have height variations or steep slopes, the "lines" of equal phase (or height) of the interferogram will be very close together. Any disturbances, noise, or other variation will make it difficult or impossible to "count" the fringes and thus measure the "height" of the various features. As an analogy, the result would be like trying to hike using a topographic map with lines every inch in height difference.

U.S. Pat. Nos. 5,907,404 and 5,926,277, assigned to the assignee of the present invention, show that a number of such interferograms taken with various phase delays in the reference beam and various wavelengths of the light source 10 may be recorded and computer analyzed to construct a "synthetic interferogram", which is an interferogram that one would measure if one had a light source of much different wavelength from the wavelengths from the light source 10. Thus, the "lines" on the interferogram could show height differences of, say, 100 microns instead of 0.4 micron height differences, so the lines would be much further apart and much easier to keep track of. Lasers of 200 micron wavelength are hard to find, and electronic imaging equipment for such wavelengths is even harder to find, and spatial resolution of such a detector, if available, could not possibly match the resolution of detectors for visible and near infrared light.

FIG. 3 shows the intensity recorded for a single pixel of the imaging device 16 as the reference mirror 14 is moved in steps perpendicular to the incident beam. The step distances can be converted to a phase shift of the reference beam measured at the image receiver 16. In a perfect world, the measurements would lie on a sinusoidal curve. If the intensity of the beams received from the object and the reference mirror were equal, the intensity would be zero when the two beams interfered destructively. For the usual case that the intensities in the two beams are not equal, the intensity of the interfering beams never reaches zero, and varies with an amplitude A about an average intensity $I_O$ which is related to the reflectivity of the object. The phase of the object beam at one pixel can be measured with respect to the phase at another pixel by inspecting the data shown by FIG. 3 for each pixel.

Manual inspection of results from a megapixel imaging device of course is difficult for humans, but easy for a computer programmed with a fast Fourier transform (FFT) program or other statistical analysis program. The FFT of a perfect sine wave gives a delta function telling the frequency of the wave, and in the case of a sine wave displaced from the origin also gives a "phase", as well as the amplitude A and average intensity $I_O$. Since the "frequency" of the results from all the pixels is the same, the relative "phase" for each pixel can be recorded from sufficient measurements of pixel intensity as the reference mirror is moved to change the phase of the reference beam. The multiple measurements remove much of the "noise" which would complicate the interpretation of an interferogram taken with an object fixed with respect to the reference mirror, as the maximum height peak of the FFT is easily identified and lower height peaks introduced by noise are ignored. The recorded measurements of phase and amplitude are sometimes called a digital hologram. The phase, amplitude, or other measurements so recorded as images are called, for the purposes of this specification, as synthetic "phase images", and can be printed out as a two dimensional image where brightness or color is directly related to phase, intensity, etc. $I_O$ can be printed out, and looks similar to the image which would be recorded in absence of the reference beam or a normal photographic or digital image of the object.

When the field of view of the optical system is too small to "see" the entire surface of the object 25, one could translate the object a known distance in a known direction perpendicular to the object beam, and record a new interferogram, and combine the interferograms. Unfortunately, systems to hold and transport objects macroscopic distances, and place them within a small part of a wavelength in position without introducing errors and microradian tilts are extremely expensive and delicate.

SUMMARY OF THE PRESENT INVENTION

The present invention includes a method of image processing, which is described in detail below with reference to its preferred embodiment. The method records at least two digital phase images of different parts of the surface of an object, each interferogram recording at least one overlapping image of the same portion of the surface of the object. The at least one of the translation vector of the relative motion of the two images, the relative phase, the tilt angle, and the direction difference between the two digital phase images are then calculated using attributes of the measurements, such as phases, amplitudes, intensities, or other statistical information generated from the data recorded to produce the recorded phase images, and the corresponding pixels of the two images are identified. Then, at least one of the phase images is corrected to account for the relative translation vector, phase, tilt angle, and tilt angle direction differences in the two images. The two-phase images are then combined into one digital phase image, thereby providing a complete image of the object under examination.

DETAILED DESCRIPTION OF THE PREFERRED EMBODIMENTS

Figure 1:
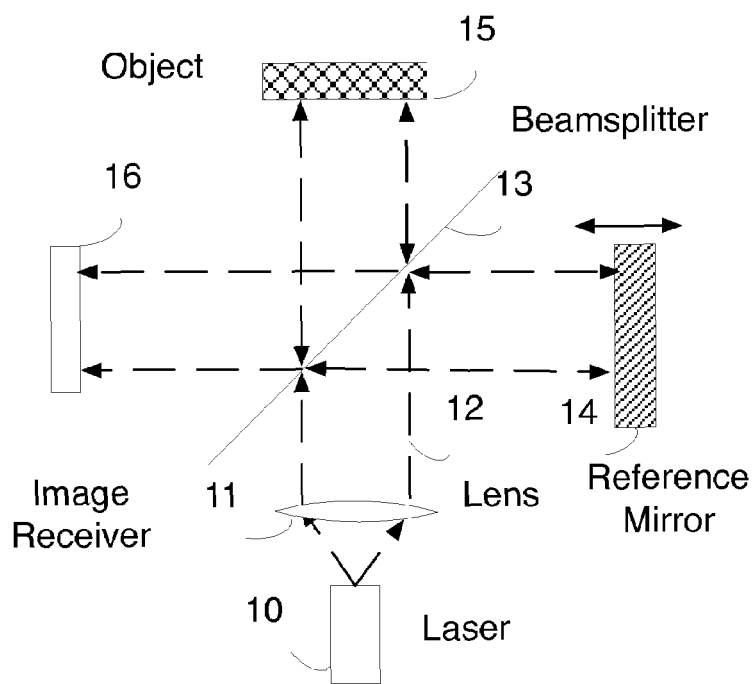
FIG. 1 shows a sketch of a prior art Michelson interferometer.
Figure 2:
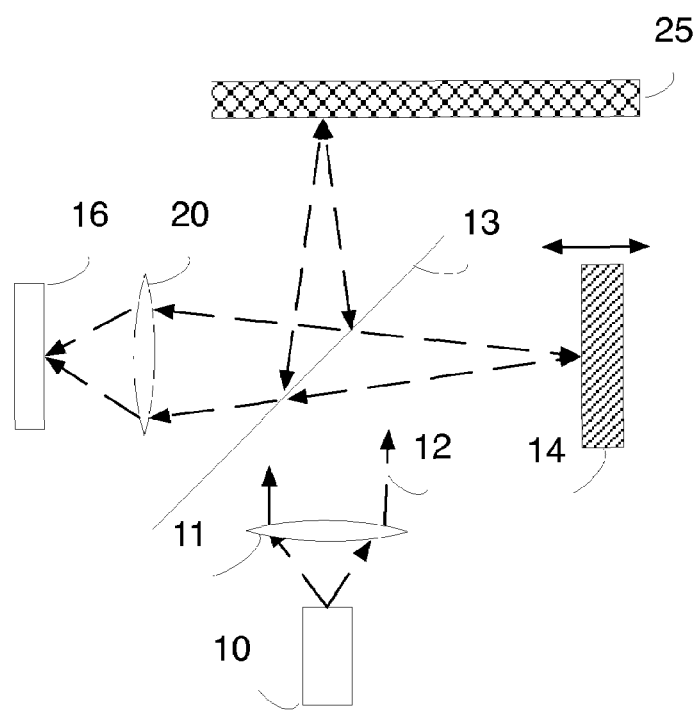
FIG. 2 shows a sketch of a prior art imaging Michelson interferometer.

The present invention is described below with reference to its preferred embodiments and variations thereof. It should be understood by those skilled in the art of interferometry that scope of the present invention is not limited to the embodiments disclosed below, but rather that the scope of the present invention is defined by the appended claims.

In one exemplary embodiment, the present invention includes a first method having the steps of constructing a first phase image of a first area of a surface of an object; then constructing a second phase image of a second area of the surface of the object, wherein the first and the second areas contain at least one overlapping portion of the surface. The first method can also include the step of registering the first phase image with respect to the second phase image by comparing at least one aspect of the first phase image with at least one aspect of the second phase image.

The first exemplary method can have several variations. For example, the at least one aspect can the amplitude determined from the pixels of the phase image, and/or the features determined by the contrast of the surface of the object are compared in the first and the second image. Similarly, the at least one aspect can be the phase determined from the pixels of the phase image. Alternatively, the features determined by the slope of the surface of the object can be compared in the first and the second image. In another variation, the at least one aspect can be the speckle pattern determined from the pixels of the phase image and/or a statistical measure determined from the pixels of the phase image.

In another exemplary embodiment, the present invention can include a second method including the steps of constructing a first phase image of a first area of a surface of an object; then constructing a second phase image of a second area of the surface of the object, wherein the first and the second areas contain at least one overlapping portion of the surface. These steps can be followed by the step of then constructing a difference phase image from the first and second phase images, the difference phase image constructed for at least a part of the at least one overlapping portion of the surface. Following calculation of the difference phase image, the second method can include the steps of calculating a tilt angle and direction from the difference phase image and adding a tilt angle and direction correction using to at least one of the first phase image and the second phase image. Another step of the second method can include combining the tilt angle and direction corrected first and second phase images to produce a single-phase image of the combined first and second areas of the surface of the object.

The second exemplary method can have several variations. For example, prior to performing any of the aforementioned steps, the method can include determining a rotation angle and translation correction for the overlapped portions of the first and second phase images followed by applying the rotation angle and translation correction to at least one of the first phase image and the second phase image to match pixels in the first phase image with corresponding pixels in the second phase image. In another variation, the first and second phase images are segmented to the overlapped portions of the first and second phase images, wherein the segmentation is performed using amplitude images of the first and second areas. Alternatively, the Fourier transforms of the amplitude images of the first and second areas can be determined, and the rotation angle and translation correction can be calculated from Fourier transforms of the amplitude images.

In another variation of the second exemplary method, the tilt angle and direction can be calculated from the difference phase image by minimizing the difference phase image as a function of the tilt angle and direction. Alternatively, the sum of the squares of pixel values of the difference image is minimized.

In another variation of the second exemplary method, the first and second phase images can be synthetic phase images calculated from a plurality of phase images recorded using a plurality of wavelengths of light. Alternatively, the second method can include the steps of determining a rotation angle and translation for the overlapped portions of the first and second phase images followed by applying a rotation angle and translation correction to at least one of the first phase image and the second phase image. In another alternative, the first and second phase images can be segmented to the overlapped portions of the first and second phase images, and the segmentation can be performed using amplitude images of the first and second areas. Alternatively, Fourier transforms of the amplitude images of the first and second areas can determined, and the rotation angle and translation correction can be calculated from Fourier transforms of the amplitude images.

In another alternative to the second exemplary method, the tilt angle and direction can be calculated from the difference phase image by minimizing the difference phase image as a function of the tilt angle and direction. Alternatively, the sum of the squares of pixel values of the difference image can be minimized.

In another exemplary embodiment of the present invention, a third method can include the steps of constructing a first phase image and a first amplitude image of a first area of a surface of an object; and constructing a second phase image and a second amplitude image of a second area of the surface of the object, wherein the first and the second area contain at least one overlapping portion of the surface and at least one non-overlapping portion of the surface. The third method can also include the steps of calculating Fourier transforms of the first and second amplitude images; segmenting the first and second phase images and amplitude images; calculating a rotation angle and translation from Fourier transforms of the amplitude images; and adding a rotation angle and translation correction at least one of the first and second phase images. The third method can also include the steps of constructing a difference phase image from the segmented first and second phase images, the difference phase image constructed for at least a part of the at least one overlapping portion of the surface; calculating a tilt angle and direction from the difference phase image; adding a tilt angle and direction correction to at least one of the first phase image and the second phase image; and combining the tilt angle and direction and rotation angle and translation corrected first and second phase images to produce a single phase image of the combined first and second areas of the surface of the object.

In another exemplary embodiment of the present invention, a fourth method can include the steps of constructing a first plurality of phase images of a first area of a surface of an object. The first plurality of phase images can be constructed from interferograms recorded at each of a first plurality of wavelengths. The fourth method can also include the steps of constructing a second plurality of phase images of a second area of the surface of the object. The second plurality of the phase images can be constructed from interferograms recorded at each of a second plurality of wavelengths. The first and the second area can contain at least one overlapping portion of the surface and at least one non-overlapping portion of the surface. The fourth method can also include the steps of constructing a first and a second synthetic phase image from the first and second plurality of phase images; and constructing a difference synthetic phase image from the first and second synthetic phase images. The difference synthetic phase image can be constructed for at least a part of the at least one overlapping portion of the surface. The fourth method can also include the steps of calculating a tilt angle and direction from the difference synthetic phase image; adding a tilt angle and direction correction to at least one of the first synthetic phase image and the second synthetic phase image; and combining the tilt angle and direction and rotation angle and translation corrected first and second synthetic phase images to produce a single synthetic phase image of the combined first and second areas of the surface of the object.

Figure 4:
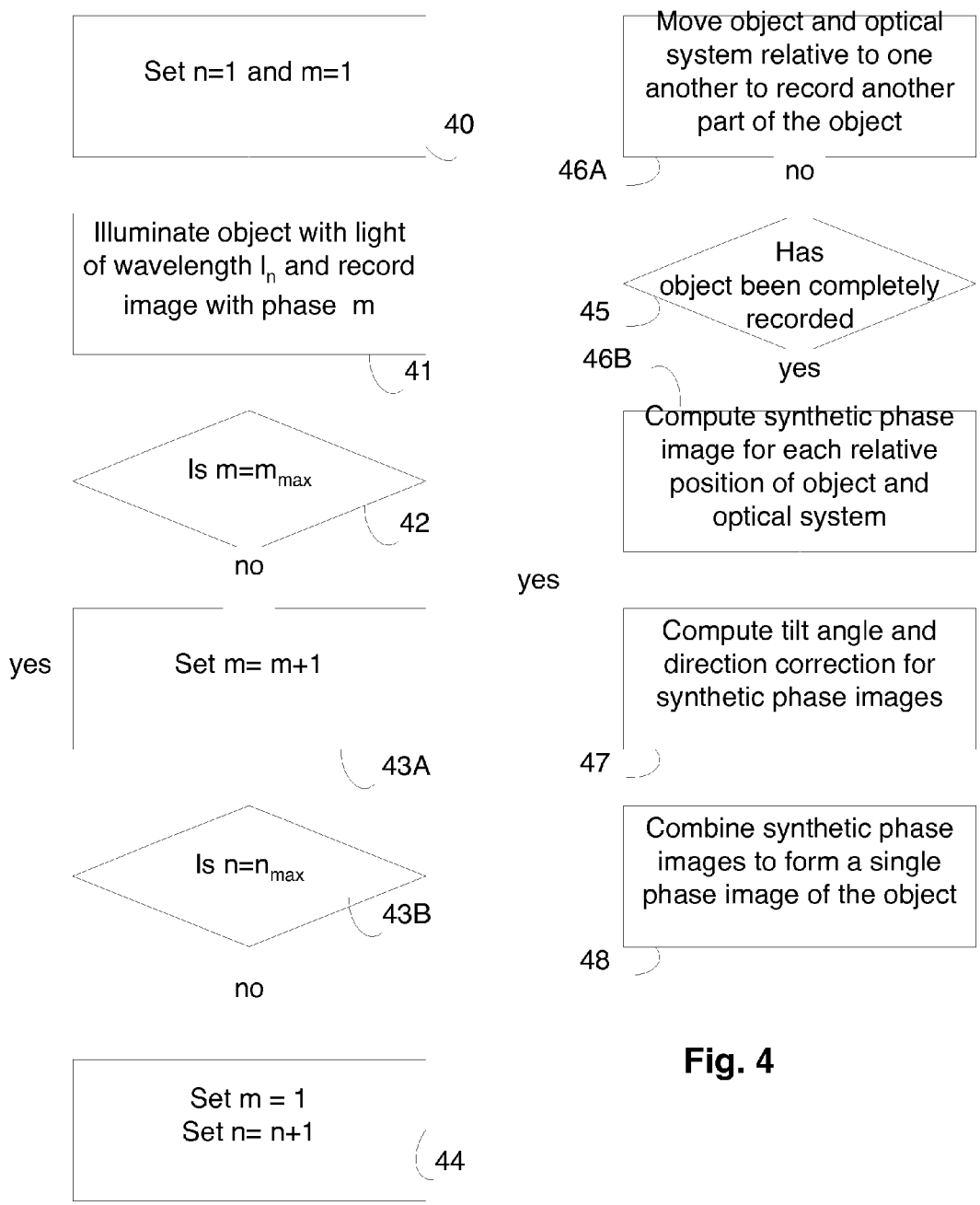
FIG. 4 shows a block diagram of an embodiment of the invention.

FIG. 4 depicts a flow chart of a preferred embodiment of the invention, adapted to function in an environment in which a synthetic phase image of an object is required and the object is too large to be imaged by the optical system. In general, images are recorded from the image receiver for number $n_{max}$ different wavelengths. For each wavelength, a number $m_{max}$ different phases of the reference beam are recorded. In the method shown in FIG. 4, integers n and m are set to 1 in step 40, then a portion of the surface of the object is illuminated in step 41 with light of wavelength $\lambda_n$ for n=1. Decision step 42 checks if $m=m_{max}$, and, if not, sets m=m+1 in step 43A and then returns to step 41. If $m=m_{max}$ in decision step 42, another decision step 43B checks whether n has reached $n_{max}$, and, if not, moves to step 44 to reset n=n+1 and m=1, and return to step 41. If all phases for all wavelengths have been recorded, step 43 B moves to decision step 45. If not all portions of the surface required have not been recorded, step 46 A moves the object and optical system relative to one another in step 46 A, and the system is returned to the beginning in step 40 to begin the recording process anew for the new portion of the surface. If all the portions of the surface have been completely recorded, decision step 45 moves the process to step 46B, where synthetic phase images for each wavelength are computed, A final synthetic phase image for the desired "synthetic wavelength" is computed for each portion of the surface measured, and the corresponding pixels of the overlapping sections of each portion of the object surface are identified as discussed below. Once the corresponding pixels have been identified, the relative tilt angle and direction introduced in the object by the motion are determined from the synthetic phase images, and the synthetic phase images are corrected by the appropriate addition of phase to the various pixels, as discussed below.

Figure 3:
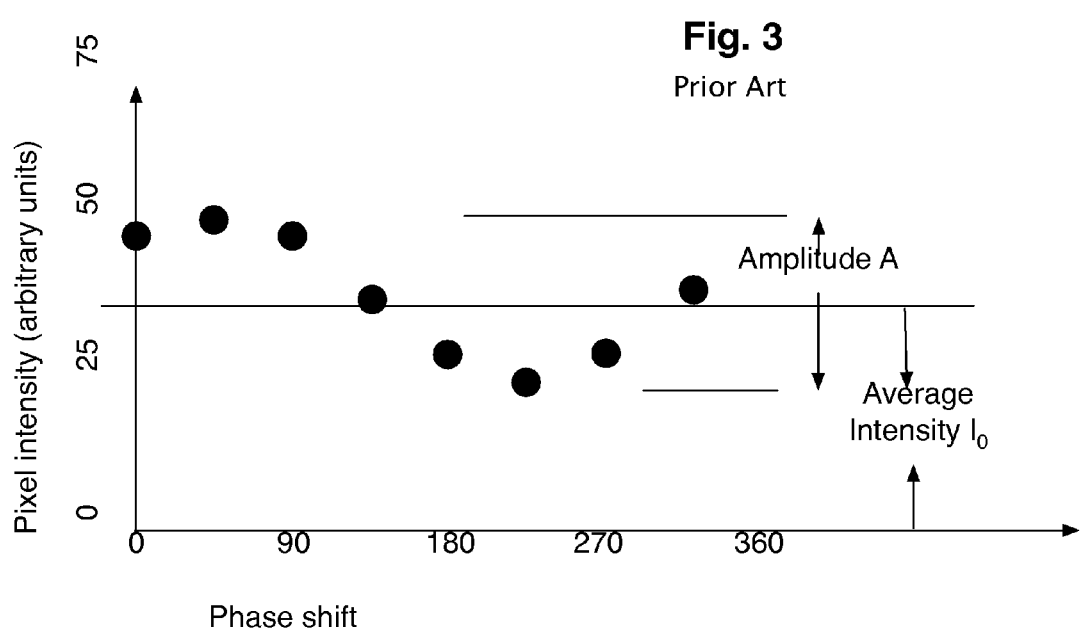
FIG. 3 shows the intensity recorded for a single pixel.

The number of phases and the number of frequencies used for the measurements are interrelated. For a single frequency, the number of phases required to make measurements such as shown in FIG. 3 is preferably 3 or more. More preferably, 4 phases, and even more preferably 5 phases are set by moving the reference mirror. Most preferably, 6 or more phases are used.

The number of wavelengths of the interfering light may be as small as one, for surfaces which have no discontinuities or slopes which would give more than a change of phase of about go degrees per pixel of the image on the image receiver. However, if there are such discontinuities and slopes, preferably at least three different wavelengths of light are used to record the synthetic phase image. More preferably, at least 5 wavelengths are used, and most preferably more than 7 wavelengths are used. Sixteen wavelengths ensure multiple redundancies in the data, and can be used for especially "noisy" results.

For interferometers with unequal object and reference arm path lengths, changing the frequency also changes the relative phase of the interfering light beams at the detector. Thus, measurements such as shown by FIG. 3 may be generated without changing the position of the reference mirror, and synthetic phase images can be constructed from such data.

The corresponding pixels of the overlapping sections of each portion of the object surface are identified most easily if there are features on the surface of the object which give good contrast in the reflected intensity of light in absence of the reference beam. $I_O$, as shown in FIG. 3, is extracted as the DC component of the Fourier transform of measurements, and the spatial Fourier transform of the $I_O$ measurements $M_1$ is recorded for the first portion of the surface measured. Similarly, $M_2$ is recorded for the second portion of the surface. Then, $M_1^* M_2^*$ gives a peak which is the translation and rotation angle that the object has moved. If there is little contrast in light reflected from the object, such as would be apparent in pieces of machined metal, an attribute of the digital hologram other than the features given by images of $I_O$ should be used. One attribute, for example, is the features on a phase image when there are scratches, digs, hollows, or hills on the surface of the object. Tooling marks on pieces of metal show up as discontinuities in the phase "lines", and can be used as features to "line up" the pixels of the two images. Changes of slope give attributes where the "density" of the equal phase lines change. Another attribute is the surface texture, which can change in a way that normal incidence reflectivity and phase is unchanged, but the speckle pattern from the part changes and shows up in the statistical ratios of the heights of peaks in the FFT. Any convenient attribute of the phase images may be used to calculate the translation distance and direction and identify corresponding pixels in the two images. In fact, subpixel resolution is easy to achieve, and new synthetic phase images are calculated by averaging neighboring pixel counts with appropriate weighting factors.

The images are most preferably segmented so that only the overlapping portions of the images are used in the calculations.

Once the phase images have been remapped to make the correspondence between each pixel in the overlapping images, the phase images may be corrected. A relative phase difference, tilt angle and tilt direction is chosen as a starting point, and one of the phase images has phase added to each pixel to account for the change of height and tilt introduced when the object is moved. Then, the phase differences between the images is minimized for each pixel, for example by minimizing the square of the differences as the chosen relative phase and tilt angle and direction are varied.

Once the best measure of the relative phase, relative tilt angle and direction has been found, appropriate phase can be added to the phases recorded for each of the synthetic phase images for each portion of the surface, and the phase images are combined to give one phase image of the entire measured portion of the surface of the object.

Obviously, many modifications and variations of the present invention are possible in light of the above teachings. It is therefore to be understood that, within the scope of the appended claims, the invention may be practiced otherwise than as specifically described.

We claim:

1. A method of processing an image comprising the steps of:
   recording a first image of a first portion of a surface of an object;
   recording a second image of a second portion of a surface of an object, wherein the first portion and the second portion are at least partially overlapping;
   determining an attribute of the first recorded image and the second recorded image;
   identifying a pixel corresponding to the first recorded image and the second recorded image in response to the determined attribute;
   correcting the first recorded image relative to the second recorded image in response to the identified pixel; and
   combining the corrected first recorded image and the second recorded image into a third image representing the first and second portions of the surface of the object.

2. The method of claim 1 further comprising the step of differentiating the first recorded image and the second recorded image in response to the determined attribute.

3. The method of claim 2 wherein the determined attribute is selected from the group consisting of: a phase measurement, an amplitude measurement, a speckle pattern, or an intensity measurement.

4. The method of claim 2 wherein the step of differentiating between the first recorded image and the second recorded image comprises calculating a translation vector of the relative motion between the first recorded image and the second recorded image.

5. The method of claim 2 wherein the step of differentiating between the first recorded image and the second recorded image comprises calculating a relative phase measurement between the first recorded image and the second recorded image.

6. The method of claim 2 wherein the step of differentiating between the first recorded image and the second recorded image comprises calculating a relative tilt angle measurement between the first recorded image and the second recorded image.

7. The method of claim 2 wherein the step of differentiating between the first recorded image and the second recorded image comprises calculating a directional difference measurement between the first recorded image and the second recorded image.

8. The method of claim 1 wherein the determined attribute is selected from the group consisting of: a phase measurement, an amplitude measurement, a speckle pattern, or an intensity measurement.

9. The method of claim 1 wherein the step of correcting the first recorded image relative to the second recorded image in response to the identified pixel comprises compensating for a relative translation vector measurement between the first recorded image and the second recorded image.

10. The method of claim 1 wherein the step of correcting the first recorded image relative to the second recorded image in response to the identified pixel comprises compensating for a relative phase measurement between the first recorded image and the second recorded image.

11. The method of claim 1 wherein the step of correcting the first recorded image relative to the second recorded image in response to the identified pixel comprises compensating for a tilt angle measurement between the first recorded image and the second recorded image.

12. The method of claim 1 wherein the step of correcting the first recorded image relative to the second recorded image in response to the identified pixel comprises compensating for a directional difference measurement between the first recorded image and the second recorded image.

* * * * *